United States Patent [19]

Gunn

[11] Patent Number: 4,579,714

[45] Date of Patent: Apr. 1, 1986

[54] METHOD FOR FUMIGATING BULK-STORED COMMODITIES

[75] Inventor: Lawrence H. Gunn, Montrose, Calif.

[73] Assignee: Pestcon Systems, Inc., Alhambra, Calif.

[21] Appl. No.: 493,011

[22] Filed: May 9, 1983

[51] Int. Cl.[4] ............................................. A61L 9/00
[52] U.S. Cl. ................................... 422/32; 426/335; 422/29
[58] Field of Search ............... 422/32, 292, 305, 29; 426/335, 532, 312, 320; 141/11, 69, 70; 264/35, 77

[56] References Cited

U.S. PATENT DOCUMENTS

| | | | |
|---|---|---|---|
| 1,641,712 | 9/1927 | Warth | 422/292 |
| 1,928,903 | 10/1933 | Manning | 422/292 |
| 2,149,790 | 3/1939 | Roesch | 141/69 |
| 2,682,465 | 6/1954 | Wiitala et al. | 141/11 |
| 2,826,486 | 3/1958 | Huter | 71/29 |
| 2,826,527 | 3/1958 | Huter | 167/14 |
| 2,965,936 | 12/1960 | Kaye | 422/305 |
| 3,097,916 | 7/1963 | Dawson et al. | 422/32 |
| 3,132,067 | 5/1964 | Rauscher et al. | 167/14 |
| 3,396,762 | 8/1968 | Paton | 422/28 |
| 3,466,841 | 9/1969 | Rausing | 422/28 |
| 3,894,124 | 7/1975 | Kishino et al. | 424/216 |
| 3,939,287 | 2/1976 | Orwig et al. | 422/32 |
| 4,005,197 | 1/1977 | Kishino et al. | 424/216 |
| 4,019,547 | 4/1977 | Ross | 141/69 |
| 4,059,048 | 11/1977 | Dickson | 99/482 |
| 4,169,050 | 9/1979 | Serfling et al. | 210/603 |
| 4,200,656 | 4/1980 | Cohen et al. | 422/40 |
| 4,200,657 | 4/1980 | Cook | 422/40 |
| 4,215,508 | 8/1980 | Allen et al. | 206/820 |
| 4,223,043 | 9/1980 | Johnson | 206/820 |
| 4,223,044 | 9/1980 | Se | 422/32 |

Primary Examiner—Barry S. Richman
Assistant Examiner—Titus B. Ledbetter, Jr.
Attorney, Agent, or Firm—Fulwider, Patton, Rieber, Lee & Utecht

[57] ABSTRACT

A method is provided for placement of selected quantities of gas-producing solid fumigant at selected locations within the depth of a bulk-stored commodity within a storage compartment, such as grain loaded into the hold of a ship. The invention comprises a fabric sleeve projecting downwardly into the grain with a closed lower end at a selected depth, and an open filler pipe received into the sleeve through which a selected quantity of fumigant is poured. The filler pipe is withdrawn to leave the fumigant at a selected depth within the sleeve, whereupon the grain compresses against and closes upper unfilled sleeve portions thereby isolating the fumigant at a selected depth within the grain where it produces penetrating toxic gases to exterminate pests. In one form, the sleeve and filler pipe are inserted as an assembly to a relatively shallow depth within the grain subsequent to loading of the hold. In another form, the sleeve and filler pipe are sized to project for a substantial depth into the grain and are suspended in place prior to loading of the hold, with a guide tube being supported within a substantial upper region of the sleeve to define an open column through which the filler pipe may be withdrawn without compressive resistance from the grain. In either form, residue from the solid fumigant is contained within the sleeve for easy separation and removal from the grain for disposal.

15 Claims, 4 Drawing Figures

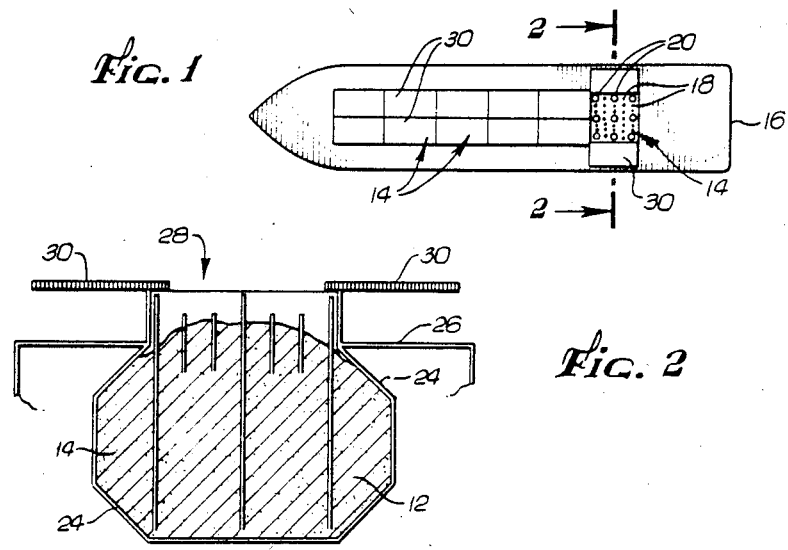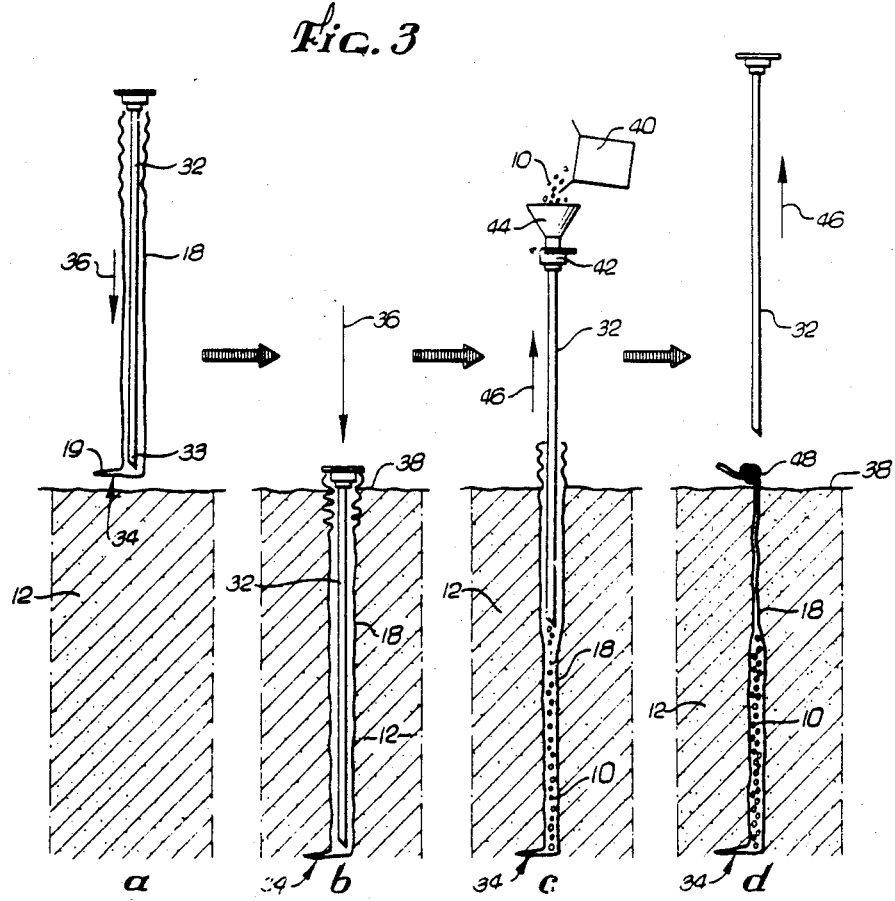

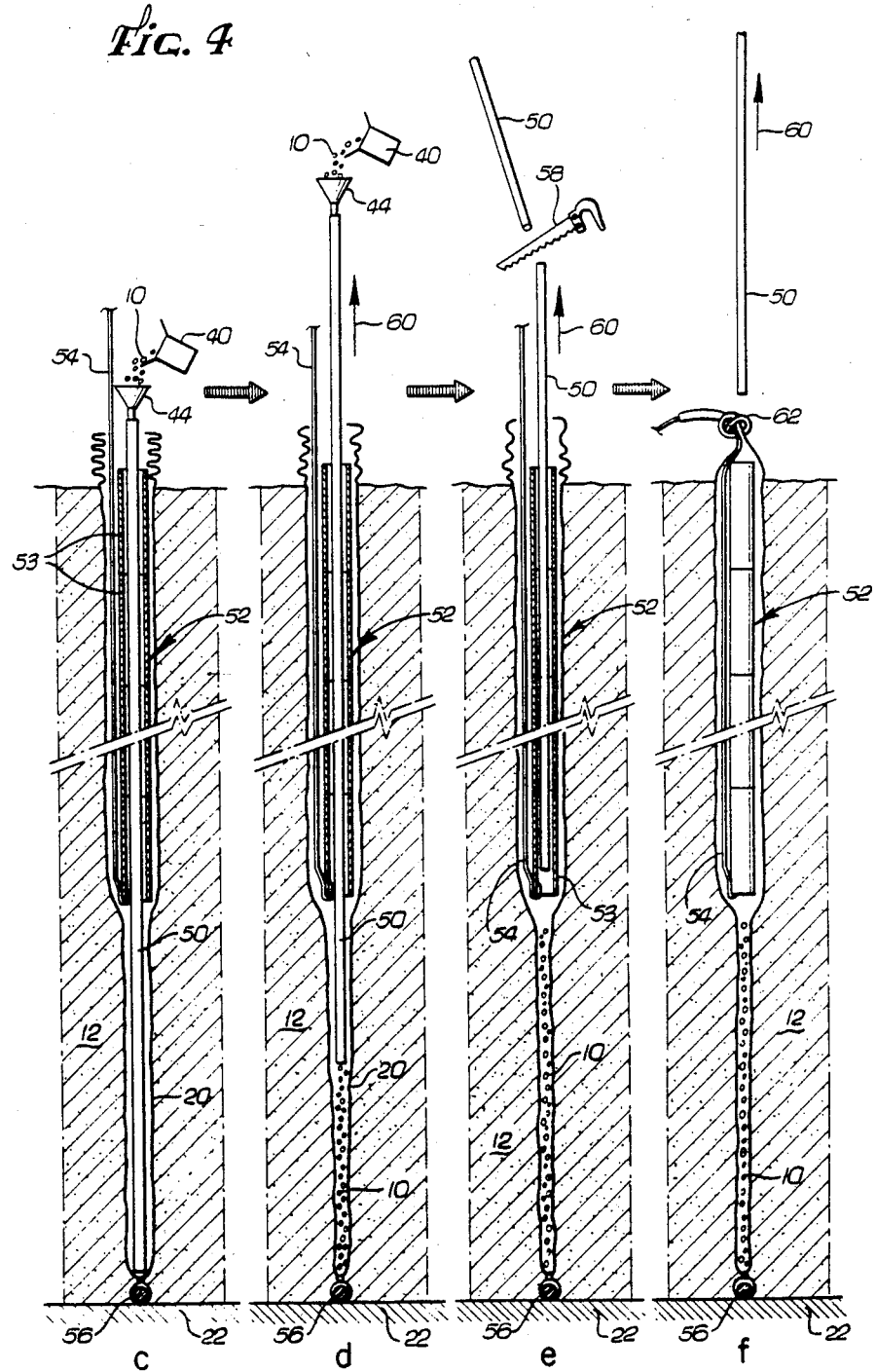

1

METHOD FOR FUMIGATING BULK-STORED COMMODITIES

BACKGROUND OF THE INVENTION

This invention relates generally to the fumigation of grain and other commodities which are stored and/or shipped in bulk storage compartments. More specifically, this invention relates to improved method for the placement of fumigant in selected quantities and at selected locations within the depth of a bulk-stored commodity, particularly such as grain within the holds of seagoing vessels or other large storage compartments, wherein the fumigant produces toxic gases which penetrate the grain to exterminate pests therein, such as insects, rodents, and the like.

In the storage and/or shipment of grain and other bulk commodities, it is common practice to fumigate each storage compartment, such as the hold of a ship, by placing a quantity of gas-producing fumigant pellets or particles within the hold. The hold is then sealed whereby toxic gas produced by the fumigant is confined for contact with extermination of pests. The object of such fumigation techniques is to produce a lethal concentration of the toxic gas which will penetrate throughout the entire body of grain and to maintain that concentration for a sufficient period of time to exterminate all pests present.

A popular type of fumigant that has been in use for many years is a metallic phosphide, such as aluminum phosphide, which decomposes in the presence of water to from hydrogen phosphide, or phosphine, a toxic gas that has proven very successful as a fumigant. Reference is made to U.S. Pat. Nos. 2,826,486, 2,826,527, and 3,132,067 for details regarding fumigants of this general type in which the fumigant is normally provided in a solid form, such as tablets or pellets, activated by atmospheric moisture to produce the toxic gas and which decomposes into a residue of generally harmless powder.

Phosphine is poisonous not only to insects and rodents, but also to humans, such that great care must be exercised in its handling and use. In the context of ship hold fumigation, for example, workmen (longshoremen) will not enter a ship hold after fumigation has commenced. For this reason, the fumigant is normally placed into the hold after the grain or the like has been loaded by placing the fumigant at or near the upper surface of the grain, typically within compartmented bags of moisture- and gas-pervious material. These bags facilitate handling of the fumigant and are penetrated by moisture-laden air within the hold to initiate the gas-producing chemical reaction when the gases flow out of the bags into contact with the grain. The bags also contain the powder residue of the decomposed fumigant such that this residue can be easily separated from the grain, for example, at the shipping destination, thereby overcoming any fears regarding the presence of fumigant residues in the grain.

Normal air movement within the body of grain, however, tends to be in an upward direction. Accordingly, fumigant gases generated at or near the top of the grain may not penetrate downwardly a sufficient distance to reach the bottom of the storage compartment, which may have a substantial depth, such as typical shipping cargo holds having a depth on the order of about 60 feet. Moreover, sealing of ship cargo hatches is not always perfect, whereby toxic gases generated at or near the top of the grain frequently escape through the hatch opening without significant or full penetration through the body of the grain. As a result, fumigation techniques wherein the fumigant is placed near the top of the grain have not been completely satisfactory.

Although it would be highly desirable to place the fumigant in the bottom of a ship hold before grain is loaded thereinto, safety regulations prevent such procedure to prevent exposure of workmen within the hold to toxic gases during the loading process. Accordingly, some efforts have been made to provide devices permitting introduction of fumigant to a position substantially below the top surface of the grain after the loading process, for example, as in the apertured pipe shown in U.S. Pat. No. 4,059,048. In general, however, such pipe-type structures have not been completely successful probably in view of a chimney effect wherein toxic gases tend to congregate within the pipe at a position near the top of the grain.

There exists, therefore, a substantial need for an improved method and apparatus for fumigating grain or other bulk-stored commodities, wherein selected quantities of gas-producing fumigant can be placed quickly and easily at selected depths within a body of the commodity, such as grain, thereby achieving a more uniform and complete penetration through the commodity and a more effective resultant extermination of pests. The present invention fulfills this need and provides further related advantages.

SUMMARY OF THE INVENTION

In accordance with the present invention, an improved method is provided for quickly and easily introducing selected quantities of dry gas-producing fumigant to selected positions within the depth of a bulk-stored commodity, such as grain loaded into the hold of a ship or the like. The invention comprises an elongated fabric sleeve of relatively narrow cross-sectional dimension which is placed into the grain with an upper end of the sleeve disposed above the upper surface of the grain and a lower sleeve end which is closed and positioned at a selected depth within the grain. A relatively small diameter filler pipe is received downwardly into the fabric sleeve to provide a vertical passage through which dry fumigant pellets or particles are poured and fall to a position generally at the lower end of the sleeve. The filler pipe is withdrawn from the fabric sleeve to leave the desired quantity of fumigant within the sleeve, whereupon grain in the hold compresses against the fabric sleeve to close upper portions thereof above the fumigant thereby preventing escape of generated toxic gases other than through penetration of the grain. After use, fumigant residue which is contained within the sleeve is separated from the grain for disposal quickly and easily by removal of the fabric sleeve.

In accordance with one preferred form of the invention, the filler pipe is received into the fabric sleeve outside the body of the grain, wherein the filler pipe has a lower end positioned a short distance, typically about six inches, from the closed lower end of the fabric sleeve, thereby providing a short flap of fabric material at the lower end of the filler pipe. The filler pipe and sleeve are then pushed together downwardly into the grain which has already been loaded into the storage compartment to position the lower ends of the filler pipe and sleeve at a selected depth within the grain limited only by the distance the pipe and sleeve can be pushed against the compressive resistance action of the grain. A selected quantity of the fumigant is then poured through the filler pipe, as described above, and the filler pipe is withdrawn leaving the fumigant within the sleeve in a short column-like configuration at a selected depth within the grain. Withdrawal of the filler pipe, to the exclusion of the fabric sleeve, is permitted by the lower end flap of the sleeve which is sufficiently engaged by the grain to hold the sleeve lower end in place.

In an alternative perferred form of the invention, the filler pipe and sleeve are provided with a length substantially beyond that which can be pushed or pulled readily against the compressive resistance action of the grain. In this form, the relatively long filler pipe and sleeve are suspended within a storage compartment prior to loading thereof with grain, with the lower ends of the filler pipe and sleeve disposed at a selected depth within the compartment. A guide tube, which may be formed from a plurality of short stacked sections, is positioned concentrically between the fabric sleeve and the filler pipe to extend over the substantial upper portion of the fabric sleeve thereby shielding the received filler pipe against the compressive resisting action of the grain. After the grain is loaded, fumigant is poured through the filler pipe to the lower end of the sleeve, which can be attached to a stabilizing weight, and the filler pipe is withdrawn through the fabric sleeve and guide tube thereby leaving the fumigant within the sleeve. In this form, the fabric sleeve is desirably filled to a point at least slightly below the guide tube thereby leaving a nonreinforced region of the sleeve immediately above the fumigant which is closed by the compressive action of the grain acting thereon.

In a typical ship hold application, the above-described two forms of the invention are preferably used in combination with one another to permit placement of fumigant quickly and easily in desired quantities and at desired different depths within the loaded grain.

Other features and advantages of the present invention will become more apparent from the following detailed description taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic plan view of a representative ship illustrating a hull having a series of holds therein adapted for fumigation in accordance with the present invention;

FIG. 2 is an enlarged fragmentary crosssectional view taken generally on the line 2—2 of FIG. 1 and illustrating fumigation of grain or the like in accordance with the present invention;

FIGS. 3a, 3b, 3c, and 3d respectively comprise enlarged fragmented vertical sections, shown somewhat in schematic form, illustrating one form of the invention and sequential steps in the use thereof for placement of fumigant at selected depths within grain or the like; and FIGS. 4a, 4b, 4c, and 4d respectively comprise enlarged fragmented vertical sections, shown somewhat in schematic form, illustrating an alternative form of the invention and sequential steps in the use thereof for placement of fumigant at selected depths within grain or the like.

DETAILED DESCRIPTION OF THE PREFERRED EMBODIMENT

Figure 4:
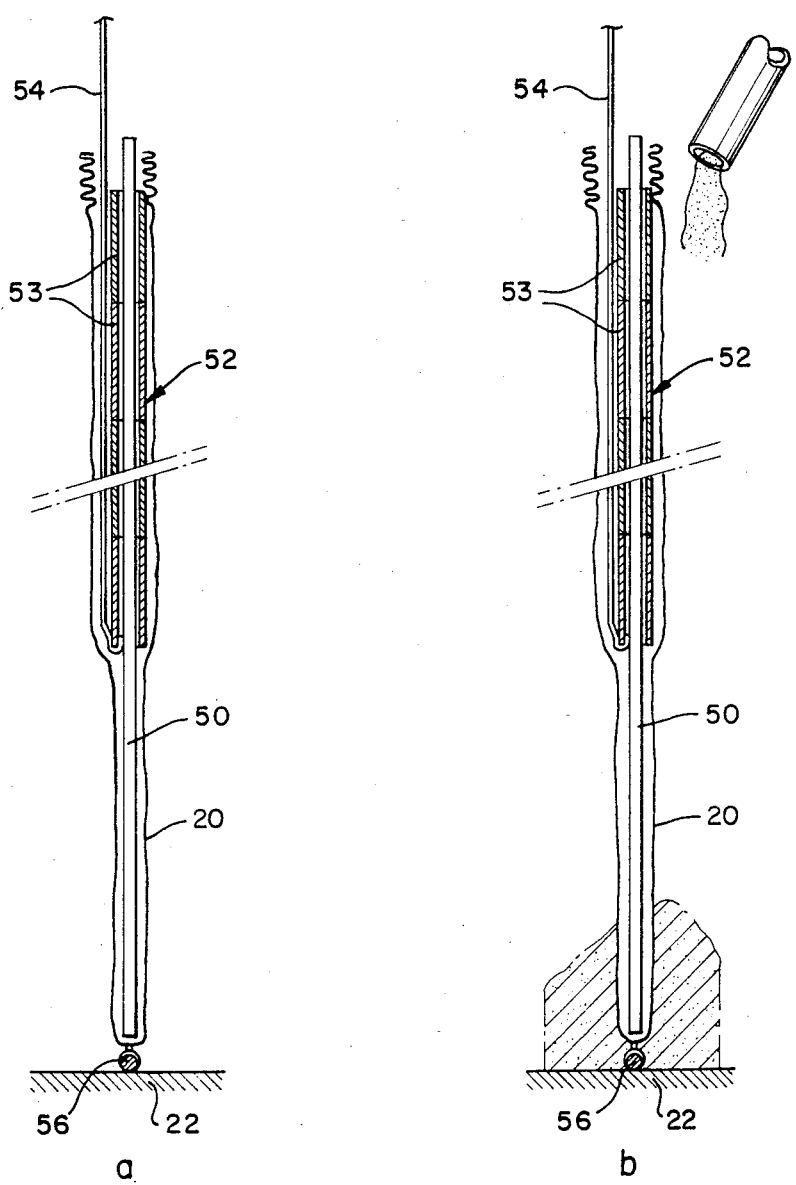

As shown in the exemplary drawings, apparatus and method are provided for placement of gas-producing fumigant 10 in selected quantities and at selected positions within the depth of a bulk commodity within a storage compartment, particularly such as grain 12 loaded into holds 14 of a ship 16 or the like. The fumigant 10 is placed into the grain 12 within gas-permeable fabric sleeves 18 and 20, wherein the sleeves 18 are relatively short for introducing the fumigant to a relatively shallow depth within the grain, whereas the sleeves 20 are relatively long for introduction of the fumigant to a substantial depth within the grain. Importantly, while the invention is shown and described herein relative to grain 12 loaded into holds 14 of a ship, it is to be understood that the invention is applicable for use in fumigating a broad range of bulk-stored commodities which have been loaded into various types of storage compartments for storage and/or shipment.

The method of the present invention provides for relatively rapid and easy introduction of the fumigant 10 to selected depths within the grain 12 subsequent to loading of the grain into a hold 14 thereby protecting workmen from undesired exposure to toxic fumes generated by the fumigant. The introduction of the fumigant within the depth of the grain to various selected positions and in selected quantities permits substantially complete penetration of the grain with generated toxic gases for substantially complete extermination of pests, such as insects, rodents, and the like, during storage and/or shipment of the grain. Importantly, in accordance with the present invention, the fumigant is placed at the desired positions by use of relatively inexpensive apparatus which maintains the residue of decomposed fumigant separate from the grain and further which can be economically discarded after use.

As shown generally in FIGS. 1 and 2, a representative cargo hold 14 for the ship 16 is formed by a bottom wall 22 in cooperation with upright side walls 24 joined at their upper ends to a top wall or deck 26 through which a hatch opening 28 is formed. The hatch opening 28 is sized to permit appropriate passage therethrough of the grain 12 or other bulk-stored commodity for loading into the hold 14, after which the hatch opening 28 is conventionally closed and sealed by hatch covers 30. Of course, upon reaching a shipping destination, the hatch covers 30 may be opened to permit unloading of the grain from the hold 14, all in a well-known manner.

Cargo holds 14 or other storage compartments vary widely in size and shape. For example, in a typical sea-going vessel, a cargo hold may be on the order of about 50 to 60 feet deep and as much as about 60 to 70 feet wide, thereby providing a hold volume capable of receiving many thousands of bushels of grain or the like. Similarly, grain storage silos or bins may have depths and/or widths of similar magnitude.

Since the grain 12 may include pests, such as insects, and is further subject to attack while in storage and/or transit by rodents or the like, the grain is normally fumigated to exterminate such pests. However, safety regulations prohibit introduction of fumigant into, for example, the hold 14 of a ship during a loading procedure to avoid exposure of workmen to toxic fumes. Instead, the fumigant 10 is conventionally introduced into the hold after the grain is loaded in a normal position generally at or near the top of the grain such that normal upward air motion within the grain all too frequently prevents lethal concentrations of the toxic gases from reaching lower portions of the cargo.

In accordance with the present invention, as illustrated schematically in FIG. 2, a plurality of the shorter fabric sleeves 18 are installed to project downwardly into the grain 12 to relatively shallow depths wherein these fabric sleeves 18 contain selected quantities of the fumigant 10. These shorter sleeves 18 are preferably combined in use with the plurality of longer fabric sleeves 20 which project downwardly into the grain to substantially greater depths to lower or bottom regions of the grain within the hold 14. These longer fabric sleeves 20 also contain predetermined quantities of the fumigant 10, whereby the combination of shorter and longer sleeves 18 and 20 permit placement of fumigant at a variety of selected depths within the grain 12, thereby achieving substantially complete penetration of the grain with lethal concentrations of toxic gas.

As shown with respect to one of the shorter fabric sleeves 18 in FIGS. 3a through 3d, the fabric sleeves 18 are installed quickly and easily into the grain 12 after the grain is loaded into the hold 14. More particularly, with reference to FIGS. 3a and 3b, each fabric sleeve 18 has an open upper end for downward reception of a cylindrical filler pipe 32 formed from a lightweight plastic material, such as PVC or the like, to have a length slightly less than the length of the fabric sleeve 18 and a diametric size for relatively easy downward sliding reception into the fabric sleeve 18. Accordingly, when the filler pipe 32 is placed within the fabric sleeve 18, the lower end 33 of the filler pipe is spaced a short distance from a lower closed end 19 of the fabric sleeve thereby leaving a relatively short sleeve flap projecting beyond the lower end 33 of the filler pipe 32, as indicated by arrow 34 in FIG. 3a.

The thus-assembled filler pipe 32 and fabric sleeve 18 are pushed as an assembly downwardly into the loaded grain 12, as illustrated by arrows 36 in FIGS. 3a and 3b, to position the lower ends thereof at a desired depth within the grain 12, with the upper ends of the filler pipe 32 and sleeve 18 being positioned at least slightly above the upper surface 38 of the grain. In practice, the depth to which the filler pipe 32 and fabric sleeve 18 may be inserted is related to the diametric size thereof and the compressive action of the grain 12 which frictionally resists passage of the filler pipe and sleeve in the downward direction. While various component dimensions can be used, a gas-permeable fabric sleeve of nylon, cotton, or the like, having a diameter up to about three inches and a filler pipe having a diameter on the order of about one and one-half inches and a length of up to about twenty feet are contemplated.

With the filler pipe 32 and fabric sleeve 18 projecting downwardly into the grain, dry particles or pellets of fumigant 10, such as aluminum phosphide, are poured from an appropriate container 40 into the open upper end of the filler pipe 32. In this regard, as viewed in FIGS. 3a through 3dk, the upper end of the filler pipe 32 advantageously may include an enlarged inlet receptacle 42 for seated reception of an appropriate funnel 44 which guides the fumigant 10 downwardly through the vertical passage defined by the filler pipe 32 to the lower ends of the filler pipe and the fabric sleeve 18.

The filler pipe 32 is withdrawn from the fabric sleeve 18, as shown by arrow 46 in FIG. 3c, simultaneously with or subsequent to the fumigant pouring step whereby the fumigant 10 exits the lower end of the filler pipe for deposition into the lower end region of the fabric sleeve 18. Importantly, the flap 34 at the lower end of the sleeve 18 provides sufficient offset sleeve structure, of say about six inches, against which the grain 12 compressively acts to hold the sleeve 18 in place as the filler pipe 32 is withdrawn.

When the desired quantity of fumigant has been poured through the filler pipe into the fabric sleeve 18, the filler pipe 32 is withdrawn completely from the sleeve, as illustrated by arrow 46 in FIG. 3d. This leaves the selected quantity of fumigant 10 generally within the lower portion of the sleeve 18 in a generally columnar configuration with the fumigant particles held tightly together by the crushing or compressive action of the grain 12. In this manner, sizable air pockets in the vicinity of the fumigant are eliminated, and moreover, the upper portion of the sleeve 18 within the grain is crushed to a closed configuration thereby preventing upward escape of toxic gases generated by the fumigant. A knot 48 is tied in the sleeve above the upper surface 38 of the grain to prevent inadvertent entry of grain into the sleeve 18.

The column of fumigant 10 within the lower portion of the fabric sleeve 18 generates toxic gas from a chemical reaction initiated by exposure to moisture within the air present throughout the hold 14. The generated gas permeates the fabric sleeve 18 generally in all directions to penetrate through the grain 12 and provide the desired extermination of pests. Importantly, the toxic gases can escape only by penetration through the grain, since open air spaces or air columns directly above the fumigant 10 are not present.

As shown in FIGS. 4a through 4d, the longer fabric sleeves 20 permit placement of predetermined quantities of the fumigant 10 to depths beyond that which the filler pipe 32 sleeve 18 as viewed in FIGS. 3a through 3d can be pushed against the compressive action of the grain. More particularly, as shown best with respect to FIG. 4a, each one of the longer sleeves 20 has an open upper end into which is received an elongated filler pipe 50 having a length generally corresponding with the length of the fabric sleeve 20, wherein the sleeve 20 and pipe 50 may extend 50 to 60 feet to the bottom of the hold 14. In addition, a guide tube 52 which may conveniently be formed from a plurality of vertically stacked, lightweight cardboard tube sections 53 is received into the sleeve 20 to extend over a substantial portion of the upper region thereof concentrically between the sleeve 20 and the filler pipe 50. The lowermost tube section is secured to a suspension rope 54 used to support the entire assembly thus described in a preselected position within the cargo hold 14 prior to loading of the grain 12 into the hold. In this regard, a weight 56 is advantageously received into the lowermost end of the sleeve 20 to stabilize the sleeve position during grain loading. When the hold is loaded, the lower end of the sleeve 20 is positioned at or a short distance above the hold bottom wall 22, whereas the upper sleeve end together with the filler pipe 20 are exposed above the upper surface 38 of the grain.

After grain loading, the fumigant 10 is poured into the upper open end of the filler pipe 50 which provides an open vertical passage for the fumigant to fall directly to the bottom of the fabric sleeve 20. As in the embodiment shown in FIGS. 3a through 3d, this fumigant may be poured from a container 40 into a funnel 44 which guides the fumigant without spillage into the filler pipe 50. In this manner, the fumigant 10 is introduced directly to a relatively low position deep within the body of the grain 12 within the hold 14. Periodic partial withdrawal of the filler pipe 50 during this pouring process deposits the fumigant within the sleeve in a relatively tightly packed columnar configuration of say about ten to fifteen feet in height, against which the grain 12 presses tightly. Fumigant pouring into the pipe 50 may continue during the withdrawal of the pipe, or may be stopped periodically to permit segments of the pipe to be cut off as by use of a saw 58 shown in FIG. 4c to maintain the upper pipe end at a convenient position above the upper surface 38 of the grain.

When a selected quantity of the fumigant 10 has been placed into the fabric sleeve 20, the filler pipe 50 is withdrawn completely, as illustrated by arrows 60 in FIGS. 4c and 4d, in an upward direction through the guide tube 52 and removed from the grain 12. This withdrawal is easily accomplished since the guide tube 52, which may have a length on the order of 40 to 50 feet, isolates the filler pipe 50 from compressive resistance action of the grain 12. This compressive resistance action, of course, closes off a portion of the fabric sleeve 20 disposed between the upper extent of the fumigant 10 and the lower end of the guide tube 52, whereby fumigant is prevented from escaping upwardly through the guide tube, but instead, the generated toxic gases are required to penetrate outwardly through the grain 12 to exterminate pests therein. A knot 62 is conveniently tied in the upper end of the fabric sleeve 20 to prevent inadvertent reception of grain downwardly into the sleeve 20.

The fabric sleeves 18 and 20 thus cooperate with their associated filler pipes 32 and 50, respectively, to permit relatively rapid and simplified introduction of the fumigant 10 in predetermined quantities to selected positions within the depth of the grain 12. The sleeves thereby permit fumigant placement at various shallow and deep positions to provide a number of toxic gas generation sites selected for maximum penetration through all regions of the grain for pest extermination. Fumigant is placed subsequent to grain loading and in a manner which isolates that fumigant against escape of the generated gases other than through penetration of the grain. Residue from the fumigant subsequent to decomposition thereof is continued within the sleeves 18 and 20 in separation from the grain 12 wherein this residue can be removed quickly and easily, for example at a shipping destination, for disposal purposes by removal and disposal of the sleeves.

The entire apparatus used in placement of the fumigant 10 consists of relatively lightweight and inexpensive plastic and fabric materials which can be transported to and handled easily at the desired site of use. Moreover, the inexpensive nature of these materials permits economic disposal thereof after use.

A variety of modifications and improvements to the invention described herein are believed to be apparent to one of ordinary skill in the art. Accordingly, no limitation on the invention is intended, except by way of the appended claims.

What is claimed is:

1. A method of fumigating grain or other bulk-stored commodity in large storage compartments, using solid fumigant which, when placed in the compartment, releases fumigating gas and produces powder residue, comprising the steps of:

positioning a selected number of gas- and moisture-pervious collapsible sleeves, having closed lower ends for holding the solid fumigant and powder residue, so that their lower ends are at selected depths within the grain or other commodity;

positioning filler pipes individually within the sleeves so that they extend from above the grain or other commodity to a location near the lower ends of the sleeves;

pouring, through the filler pipes to the lower ends of the sleeves positioned within the grain, a quantity of fumigant sufficient to fill only a region of the sleeves disposed below the upper surface of the grain or other commodity;

removing the filler pipes from the sleeves whereby the grain or other commodity compresses against and closes off the sleeves above the fumigant therein to prevent escape of generated toxic gases other than by penetration through the grain or other commodity; and permitting fumigant to pass through the grain or other commodity.

2. The method of claim 1 including the step of removing the sleeves and powder residue therein, after the fumigant is permitted to pass through the grain or other commodity.

3. The method of claim 1 wherein the sleeves have different lengths, so that their lower ends can be positioned at different depths within the grain or other commodity.

4. The method of claim 3 wherein said sleeve positioning step comprises positioning a plurality of the sleeves with their lower ends at a shallow depth and a plurality of the sleeves with their lower ends at a substantially deeper depth within the grain or other commodity.

5. The method of claim 1 wherein the filler pipes are withdrawn by successively removing portions of it from the grain or other commodity during the pouring step.

6. The method of claim 5 including the step of periodically severing withdrawn portions of the filler pipes.

7. The method of claim 1 wherein said steps of positioning the sleeves and filler pipes comprise inserting a filler pipe into an open upper end of a sleeve to project generally within the sleeve from the upper to the lower ends thereof, pushing the assembled sleeve and filler pipe together downwardly into the grain or other commodity after loading thereof into the compartment to position the sleeve and filler pipe lower ends within the grain or other commodity and to position the sleeve and filler pipe upper ends above the top surface of the grain or other commodity.

8. The method of claim 7 wherein said inserting step comprises inserting the filler pipe into the sleeve so that the lower end of the filler pipe is spaced a short distance from the lower end of the sleeve thereby forming a flap projecting beyond the lower end of the filler pipe whereby the weight of the grain or other commodity acting upon the flap prevents the sleeve from being removed upon withdrawal of the filler pipe.

9. The method of claim 7 including the step of tying a knot in an upper portion of the sleeve subsequent to the pouring process.

10. The method of claim 1 wherein said steps of positioning the sleeves and the filler pipes comprise inserting the filler pipes into the sleeves, inserting guide tubes into the sleeves, about the filler pipes, suspending the sleeves, guide tubes, and filler pipes, within the compartment prior to loading thereof with the grain or other commodity, at selected positions with the filler pipes extending generally from the upper to the lower ends of the sleeves so that the guide tubes are suspended over an upper portion of the sleeves, and loading the compartment with the grain or other commodity.

11. The method of claim 10 wherein said pouring step comprises filling a lower portion of the sleeve with fumigant to a position at least slightly below the lowermost end of the guide tube whereby the grain or other commodity compresses against and closes off the sleeves, at positions above the fumigant therein and below the lowermost ends of the guide tubes, when the filler pipes are removed from the sleeves.

12. The method of claim 10 including providing a weight at the lower end of each of the sleeves.

13. A method of fumigating grain or other bulk-stored commodity in large storage compartments, using solid fumigant which, when placed in the compartment, releases fumigating gas and produces powder residue, comprising the steps of:
 positioning a collapsible sleeve of gas and moisture permeable fabric, said sleeve having an open upper end and a closed lower end, so that its lower end is at a selected depth within the grain or other commodity;
 positioning a filler pipe within the sleeve so that an upper end of the pipe is at least slightly above the top surface of the grain or other commodity and the lower end of the pipe is generally adjacent the lower end of the sleeve;
 pouring, into the upper end of the filler pipe for passage through the filler pipe to the lower end of the sleeve positioned within the grain, a quantity of fumigant sufficient to fill only a region of the sleeve disposed below the upper surface of the grain or other commodity;
 withdrawing the filler pipe from the sleeve leaving the sleeve lower end within the grain or other commodity; and
 permitting fumigant to pass through the grain or other commodity.

14. A method of fumigating grain or other bulk-stored commodity in large storage compartments, using solid fumigant which, when placed in the compartment, releases fumigating gas and produces powder residue, comprising the steps of:
 inserting a filler pipe with an open upper pipe end and an open lower pipe end, into a collapsible sleeve of gas and moisture permeable fabric, said sleeve having a closed lower end, and orienting the pipe so that the open upper pipe end is generally adjacent an open upper end of the sleeve the open lower pipe end is and generally adjacent the lower end of the sleeve;
 inserting the assembled pipe and sleeve into the grain or other commodities to position the lower end of the sleeve at a selected depth therein and the upper ends of the sleeve and pipe at least slightly above the upper surface of the grain or other commodity;
 pouring a selected quantity of the fumigant into the upper end of the filler pipe inserted into the grain for passage of the fumigant through the filler pipe to the lower end of the sleeve, the selected quantity of fumigant being sufficient to fill a region of the sleeve disposed below the upper surface of the grain or other commodity;
 withdrawing the filler pipe from the sleeve leaving the sleeve lower end within the grain or other commodity; and
 permitting fumigant to pass through the grain or other commodity.

15. A method of fumigating grain or other bulk-stored commodities in large storage compartments, using solid fumigant which, when placed in the compartment, releases fumigating gas and produces powder residue, comprising the steps of:
 inserting a filler pipe, with an open upper pipe end and an open lower pipe end, into a collapsible sleeve of gas and moisture permeable fabric, said sleeve having a closed lower end, and orienting the pipe so that the open upper pipe end is generally adjacent an open upper end of the sleeve the open lower piper end is generally adjacent the lower end of the sleeve;
 inserting a guide tube into an upper portion of the sleeve, about the pipe;
 suspending the assembled pipe and sleeve within the compartment prior to loading with the grain or other commodity so that the guide tube is held within an upper portion of the sleeve and the upper ends of the pipe and sleeve are disposed at least slightly above the upper surface of the grain or other commodity when the grain or other commondity is loaded into the compartment;
 loading the grain or other commodity into the compartment;
 pouring a selected quantity of the fumigant into the upper end of the suspended filler pipe for passage through the filler pipe to the lower end of the sleeve, to fill the sleeve to a position at least slightly below the guide tube; and
 withdrawing the filler pipe from the sleeve leaving the sleeve lower end within the grain or other commodity; and
 permitting fumigant to pass through the grain or other commodity.

* * * * *

UNITED STATES PATENT AND TRADEMARK OFFICE
CERTIFICATE OF CORRECTION

PATENT NO. : 4,579,714

DATED : Apr. 1, 1986

INVENTOR(S) : Lawrence H. Gunn

It is certified that error appears in the above-identified patent and that said Letters Patent is hereby corrected as shown below:

Column 1, line 23, after 'with' insert --and--

Column 1, line 32, delete "from" insert --form-- therefore

Column 3, line 54, delete "crossectional" and insert --cross-sectional-- therefore Column 6, line 36, after 'pipe 32' insert --and--

Column 9, line 55, after 'sleeve' insert --and--

Column 10, line 1, after 'is' delete "and"

Signed and Sealed this

Fifth Day of August 1986

[SEAL]

Attest:

DONALD J. QUIGG

Attesting Officer

Commissioner of Patents and Trademarks